United States Patent
Achhra et al.

(10) Patent No.: US 12,470,391 B2
(45) Date of Patent: Nov. 11, 2025

(54) MULTIPLE INTERACTION PROCESSING

(71) Applicant: Visa International Service Association, San Francisco, CA (US)

(72) Inventors: Santosh Lachhman Achhra, Singapore (SG); Anirudh Srinivas Madhavan, Singapore (SG)

(73) Assignee: Visa International Service Association, San Francisco, CA (US)

( * ) Notice: Subject to any disclaimer, the term of this patent is extended or adjusted under 35 U.S.C. 154(b) by 70 days.

(21) Appl. No.: 18/689,390

(22) PCT Filed: Aug. 23, 2022

(86) PCT No.: PCT/US2022/041256
§ 371 (c)(1),
(2) Date: Mar. 5, 2024

(87) PCT Pub. No.: WO2023/043589
PCT Pub. Date: Mar. 23, 2023

(65) Prior Publication Data
US 2024/0372728 A1 Nov. 7, 2024

Related U.S. Application Data

(60) Provisional application No. 63/244,446, filed on Sep. 15, 2021.

(51) Int. Cl.
*H04L 9/32* (2006.01)
*H04L 9/08* (2006.01)

(52) U.S. Cl.
CPC .......... *H04L 9/3228* (2013.01); *H04L 9/0863* (2013.01); *H04L 9/3213* (2013.01)

(58) Field of Classification Search
CPC .......... G06F 21/31; G06F 21/44; G06F 21/46; G06Q 20/02; G06Q 20/102; G06Q 20/29;
(Continued)

(56) References Cited

U.S. PATENT DOCUMENTS 8,838,973 B1 * 9/2014 Yung ................. H04L 63/1483
713/172
9,692,752 B2 6/2017 Keys
(Continued)

FOREIGN PATENT DOCUMENTS

| WO | 2017218138 A1 | 12/2017 |
| WO | 2021158422 A1 | 8/2021 |
| WO | 2021178773 A1 | 9/2021 |

OTHER PUBLICATIONS

PCT/US2022/041256, "International Search Report and Written Opinion", Dec. 5, 2022, 11 pages.
(Continued)

*Primary Examiner* — John M MacIlwinen
(74) *Attorney, Agent, or Firm* — Kilpatrick Townsend & Stockton LLP

(57) ABSTRACT

A method is disclosed. The method includes processing a group interaction request for an interaction involving a group. Better assurance for the interaction is provided by providing a one-time password that has a number of portions that are sent to a plurality of user devices. The portions are received and one user device may concatenate the portions to form the one-time password. It may then be entered to authenticate the interaction. Other examples include the use of an authorization request message that is authorized for an initial value. Later, separate authorization request messages with different credentials may be transmitted for different users in the group.

20 Claims, 5 Drawing Sheets

(58) Field of Classification Search
CPC ............ G06Q 20/322; G06Q 20/3223; G06Q 20/3821; G06Q 20/384; G06Q 20/385; G06Q 20/409; H04L 9/0863; H04L 9/3213; H04L 9/3228; H04L 2209/56
See application file for complete search history.

(56) References Cited

U.S. PATENT DOCUMENTS

| | | | |
|---|---|---|---|
| 2002/0144128 A1* | 10/2002 | Rahman | ............... H04L 9/3228 |
| | | | 713/186 |
| 2014/0172704 A1 | 6/2014 | Atagun et al. | |
| 2015/0095175 A1 | 4/2015 | Dua | |
| 2015/0142657 A1 | 5/2015 | Sagastiverza et al. | |
| 2016/0071087 A1* | 3/2016 | Mittal | ............... G06Q 20/3224 |
| | | | 705/44 |
| 2017/0012959 A1* | 1/2017 | Sierra | .................. H04L 63/104 |
| 2017/0364914 A1* | 12/2017 | Howard | ............ G06Q 20/3678 |
| 2021/0004454 A1* | 1/2021 | Chester | ................ H04L 9/3213 |
| 2021/0049560 A1 | 2/2021 | Kulpati et al. | |
| 2021/0243194 A1 | 8/2021 | Nelsen et al. | |
| 2021/0312030 A1* | 10/2021 | Maroshi | ............... G06F 21/602 |

OTHER PUBLICATIONS

EP22870491.2 , "Extended European Search Report", Nov. 14, 2024, 10 pages.

* cited by examiner

MULTIPLE INTERACTION PROCESSING

CROSS-REFERENCE TO RELATED APPLICATIONS

This application is a National Stage of International Application No. PCT/US2022/041256, filed Aug. 23, 2022, which claims priority to U.S. Provisional Application No. 63/244,446, filed on Sep. 15, 2021, which are herein incorporated by reference in their entirety.

BACKGROUND

Interactions such as group interactions involving a group of users can be problematic. For example, a single group interaction can require a number of separate interactions. For instance, to conduct a group interaction, each member of the group may need to interact with a resource provider that is providing a service to the group. Some resource providers will not allow this. And, even if they do, such group interactions can be cumbersome and time consuming for both the members of the group and the resource provider. As an example, if there are five members of a group, each member of the group may be required to interact with the resource provider. This will result in five separate interactions with the resource provider. Another problem is that, in some instances, users in a group may miscommunicate their intent to participate in the group and/or their share of responsibility for the group interaction. If a member of a group does not wish to participate or misunderstands their share of the responsibility, then the group interaction may be inhibited or it may result in an erroneous interaction request. In the latter case, the interaction request may eventually be reversed, or it may not be reversible. This can cause unnecessary additional communications and/or problems for all parties that are involved in such interactions.

Embodiments address these and other problems individually and collectively.

BRIEF SUMMARY

Embodiments of the invention include methods, computers, and systems, for improving the efficiency, security, and convenience for group interactions.

One embodiment of the invention includes a method comprising: receiving, by a processing computer, a group interaction request message from a user device within a group of user devices; responsive to receiving the request for the group interaction, determining, by the processing computer, a token; providing, by the processing computer, the token to the user device; receiving, by a processing computer, an authorization request message comprising a token; responsive to receiving the authorization request message, generating a one-time password, the one-time password comprising a plurality of password portions; transmitting, by the processing computer, the plurality of password portions to the group of user devices, respectively; receiving, by the processing computer, from one of the user devices within the group, the one-time password; and initiating, by the processing computer, authorization of the group interaction using credentials associated with user devices in the group of user devices.

Another embodiment of the invention includes a processor computer comprising: a processor; and a non-transitory computer readable medium, the non-transitory computer readable medium comprising code, executable by the processor for performing operations including: receiving a group interaction request message from a user device within a group of user devices; responsive to receiving the request for the group interaction, determining a token; providing the token to the user device; receiving an authorization request message comprising the token; responsive to receiving the authorization request message, generating a one-time password, the one-time password comprising a plurality of password portions; transmitting the plurality of password portions to the group of user devices, respectively; receiving from one of the user devices within the group, the one-time password; and initiating authorization of the group interaction using credentials associated with user devices in the group of user devices.

Another embodiment of the invention includes a method. The method comprises: receiving, by a processing computer, a group interaction request message from a user device within a group of user devices for a group interaction; responsive to receiving the request for the group interaction, determining, by the processing computer, a token and linking the token to a credential associated with the user device in the group of user devices; providing, by the processing computer, the token to the user device; receiving, by a processing computer, an authorization request message comprising the token and an initial value; determining, the credential associated with the token; transmitting, by the processing computer to an authorizing entity computer, the authorization request comprising the credential and the initial value, wherein the authorizing entity computer approves of the authorization request message, and responsive to transmitting the authorization request message, receiving, by the processing computer from the authorizing entity computer, an authorization response message, wherein the processing computer performs subsequent processing with credentials associated with at least the other users devices in the group of user devices to complete the group interaction.

Another embodiment of the invention includes a processor computer comprising: a processor; and a computer readable medium, the computer readable medium comprising code, executable by the processor for performing operations including: receiving, by the processing computer, a group interaction request message from a user device within a group of user devices for a group interaction; responsive to receiving the request for the group interaction, determining, by the processing computer, a token and linking the token to a credential associated with the user device in the group of user devices; providing, by the processing computer, the token to the user device; receiving, by a processing computer, an authorization request message comprising the token and an initial value; determining, the credential associated with the token; transmitting, by the processing computer to an authorizing entity computer, the authorization request comprising the credential and the initial value, wherein the authorizing entity computer approves of the authorization request message, and responsive to transmitting the authorization request message, receiving, by the processing computer from the authorizing entity computer, an authorization response message, wherein the processing computer performs subsequent processing with credentials associated with at least the other users devices in the group of user devices to complete the group interaction.

These and other embodiments are described in further detail below.

DETAILED DESCRIPTION

Figure 1:
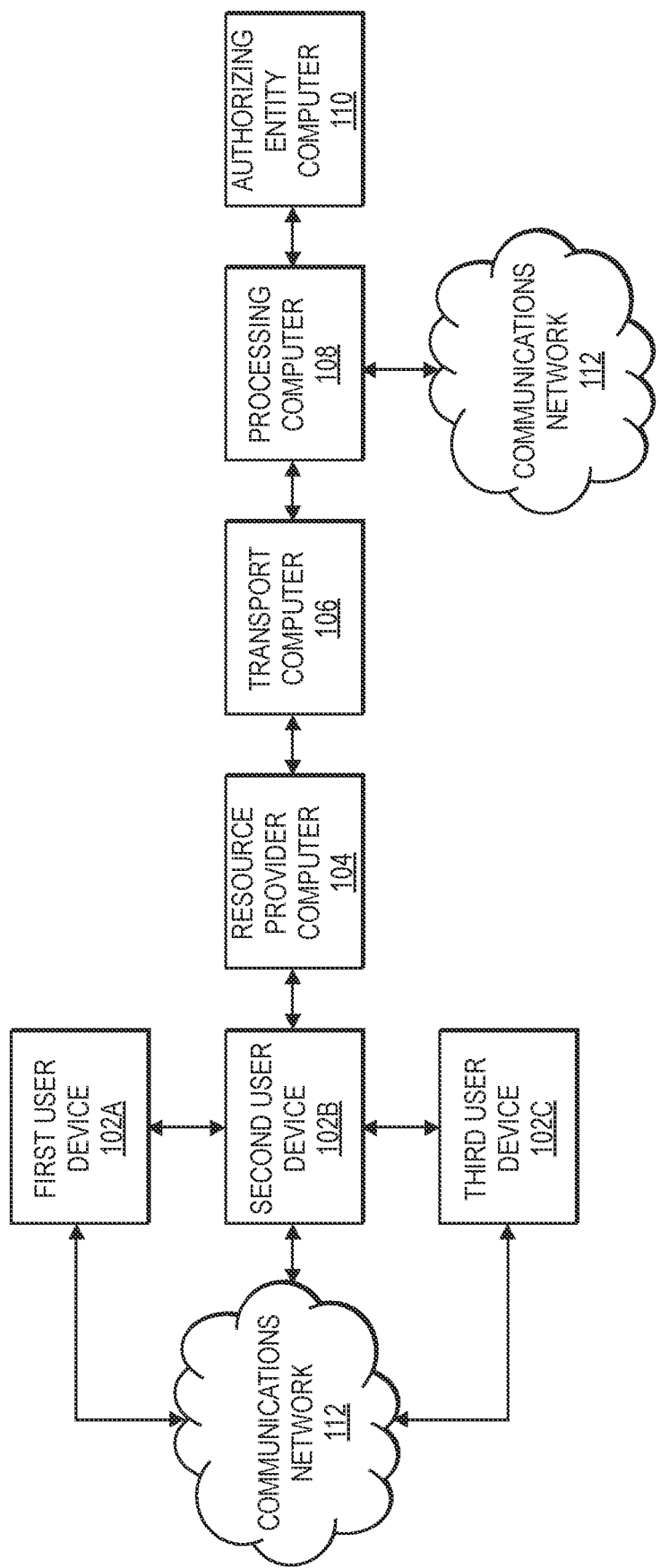
FIG. 1 shows a block diagram of a system according to an embodiment.

A "local data connection" can include a short range communication connection between two or more devices that are intended to interact with each other. A local data connection can be formed using an RF mode of communication such as near field communications (NF), Bluetooth, Bluetooth Low Energy (BLE), etc. In other embodiments, another mode of communication such as light (e.g., infrared) or audio signals may be used.

An "access device" may be any suitable device that provides access to a resource. An access device may be in any suitable form. Some examples of access devices include vending machines, kiosks, POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), and the like. An access device may use any suitable contact or contactless mode of operation to send or receive data from, or associated with, a user mobile communication device. In some embodiments, an access device may include a reader, a processor, and a computer-readable medium. A reader may include any suitable contact or contactless mode of operation. For example, exemplary readers can include radio frequency (RF) antennas, optical scanners, bar code readers, or magnetic stripe readers to interact with a payment device and/or mobile communication device.

"Access data" may include any suitable data that can be used to access a resource or create data that can access a resource. In some embodiments, access data may be account information for a payment account. Account information may include a PAN, payment token, expiration date, card verification values (e.g., CVV, CVV2), dynamic card verification values (dCVV, dCVV2), an identifier of an issuer with which an account is held, etc. In other embodiments, access data could include data that can be used to access a location or to access secure data. Such information may be ticket information for an event, data to access a building, transit ticket information, passwords, biometrics or other credentials to access secure data, etc.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more access devices.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user device" may be any suitable device that is operated by a user. Suitable user devices can be portable, and can communicate with external entities such as access devices. Examples of user devices include cards that data stored on them, mobile phones, laptop computers, transponders, wearable devices such as smart watches, automobiles with remote communication capabilities, access cards, smart media, etc. A payment device may be an example of a user device.

A "payment device" may refer to a device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. If the payment device is in the form of a debit, credit, or smartcard, the payment device may also optionally have features such as magnetic stripes. Such devices can operate in either a contact or contactless mode.

A "mobile communication device" may comprise any suitable electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile communication device may comprise any suitable hardware and software for performing such functions, and may also include multiple devices or components (e.g. when a device has remote access to a network by tethering to another device—i.e.

using the other device as a modem—both devices taken together may be considered a single mobile communication device).

A "user" may include an individual. In some embodiments, a user may be associated with one or more personal accounts and/or user devices.

A "credential" may be any suitable information that serves as reliable evidence of worth, ownership, identity, or authority. A credential may be a string of numbers, letters, or any other suitable characters that may be present or contained in any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile communication device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "application" may be computer code or other data stored on a computer readable medium (e.g. memory element or secure element) that may be executable by a processor to complete a task. An example of an application can be a sharing application. A sharing application can facilitate the sharing of information, such as for a group interaction between different users operating different user devices.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile communication device or access device.

FIG. 1 shows a system according to embodiments of the invention. The system comprises a plurality of user devices (e.g., first user device 102A, second user device 102B, third user device 102C), which can communicate with each other via short range communication protocols (e.g., Bluetooth™, Wi-Fi™, etc.), of via a communications network 112. The plurality of user devices 102A, 102B, 102C can also communicate with a remotely located processing computer 108 via the communications network 112. Although three user devices 102A, 102B, 102C are illustrated in FIG. 1, it is understood that embodiments of the invention may include any suitable number of user devices.

Any of user devices 102A, 102B, 102C can interact with a resource provider computer 104, which may be operated by an entity such as a resource provider. The resource provider computer 104 could be an access device such as a POS terminal, or it could be a remotely located computer such as a Web server. The resource provider computer 104 can be configured to receive access data from the one or more user devices 102A, 102B, 102C. In some embodiments, the resource provider operating the resource provider computer may be a merchant or an entity that allows access to a secure location or secure data.

The resource provider computer 104 may communicate with an authorizing entity computer 110 via a transport computer 106 and the processing computer 108.

The authorizing entity computer 110 can be a computer that is associated with an authorizing entity (e.g., a bank), a secure data access provider, an entity that can provide access to a location, or the like. The authorizing entity computer 110 may include a processor and a computer readable medium coupled to the processor, the computer readable medium comprising code, executable by the processor for performing the functions including approving or declining authorization request messages, and generating authorization response messages The processing computer 108 may be a server computer. The processing computer 108 may include a processor and a computer readable medium coupled to the processor. The processing computer 108 may be part of a network such as a payment processing network.

A payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
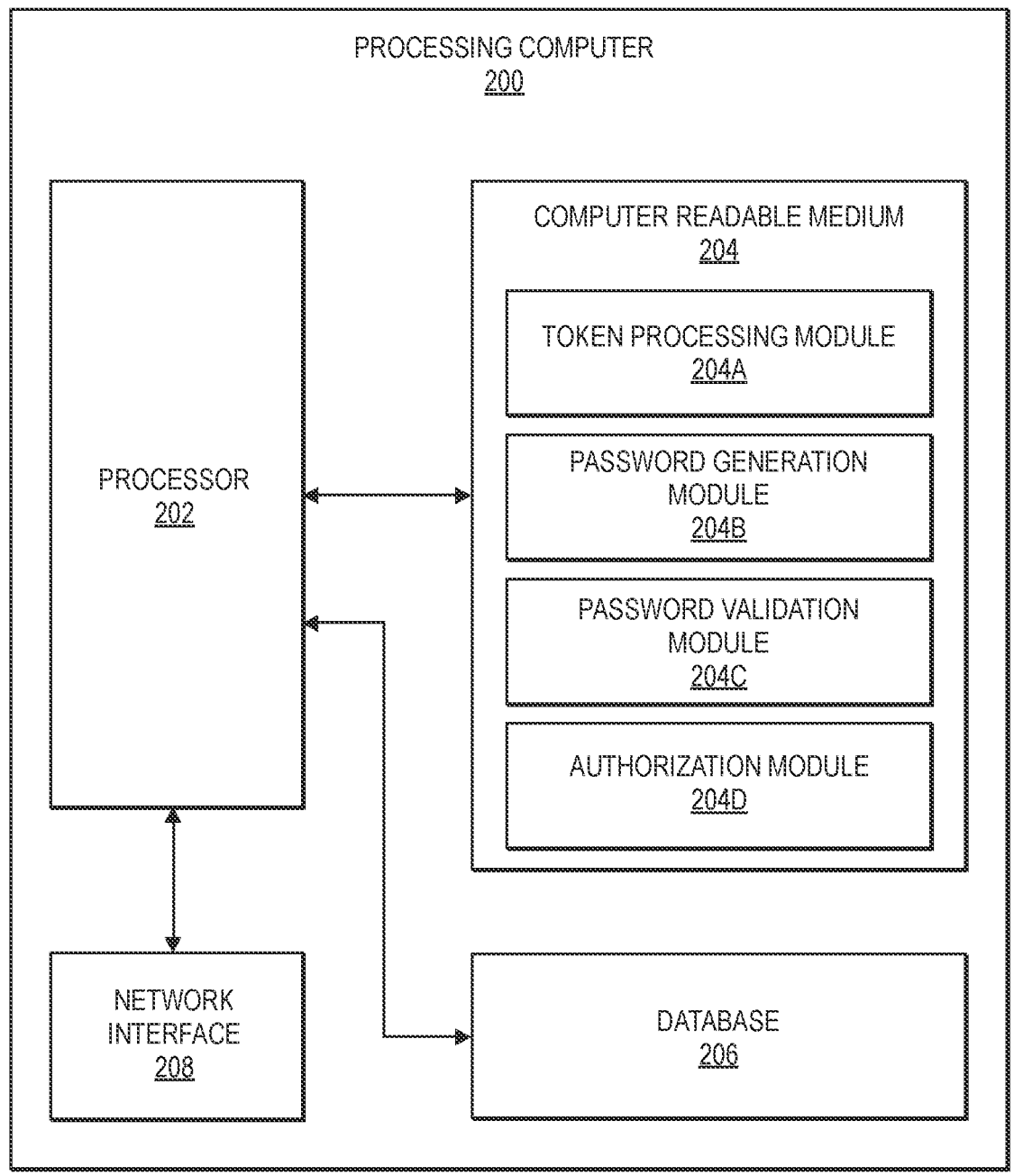
FIG. 2 shows a block diagram of a processing computer according to an embodiment.

FIG. 2 shows a block diagram of an exemplary processing computer 200 according to an embodiment. The processing computer 200 includes a processor 202 and a computer readable medium 204, a database 206, and a network interface 208 coupled to the processor 202. In some embodiments, the processing computer 200 may include the functionality and/or hardware of a token service computer.

The computer readable medium 204 may comprise a token processing module 204A, a password generation module 204B, a password validation module 204C, and an authorization module 204D.

The database 206 may store tokens and their associated credentials in a database. The database 206 may store data in a database such as an Oracle™ database. The database 206 may also store passwords such as one-time passwords (OTPs) and portions of one-time passwords. In some embodiments, the portions of the OTPs may be stored in association with the particular credentials. Further, in some embodiments, one or more group identifiers may also be associated with a particular credential (e.g., a primary account number). For instance, a particular credential such as a credit card number or access badge number for a user may be associated with a first group of users and a different, second group of users when the user is a member of the first and second groups of users. Also, in some instances, indications of the responsibility for each user in a group can be stored in association with a user's credential within a group identified by a group identifier. For example, if a group of users has three users, they can agree that each member of the group will have one third responsibility for any obligations of the group. This information may be stored in the database 206 with the group identifier and the credentials of the members of the group. In addition, a token (e.g., a one-time payment token or virtual card) can also be stored with the information regarding the group.

The token processing module 204A may comprise code that causes the processor 202 to provide tokens such as access tokens (e.g., payment tokens). For example, the token processing module 204A may contain logic that causes the processor 202 to generate a payment token and/or associate the payment token with a set of payment credentials. A token record may then be stored in a token record database indicating that the payment token is associated with a certain user or a certain set of payment credentials. The token processing module 204A may also comprise code that causes the processor 202 to exchange a token for a credential, or exchange a credential for a token.

The password generation module 204B may comprise code that causes the processor 202 to generate passwords such as one-time passwords. In some embodiments, the password generation module 204B and the processor 202 can generate a password that may be formed from different portions. For example, a password may be a randomly generated value such as 128728199401, which may include different portions "128", "728", "199", and "401" which may be concatenated together. As will be explained in further detail below, these portions may be transmitted to different user devices of a group of user devices associated with a group of users.

The password validation module 204C may comprise code that causes the processor 202 to validate passwords. To validate a password, the password validation module 204C can retrieve a previously generated password from the database 206 and can compare it to a received password.

The authorization module 204D may comprise code, executable by the processor 202 to generate and process authorization request and response messages.

The computer readable medium 204 may also comprises code for causing the processor 202 to perform operations including: receiving a group interaction request message from a user device within a group of user devices; responsive to receiving the request for the group interaction, determining a token; providing the token to the user device; receiving an authorization request message comprising the token; responsive to receiving the authorization request message, generating a one-time password, the one-time password comprising a plurality of password portions; transmitting the plurality of password portions to the group of user devices, respectively; receiving from one of the user devices within the group, the one-time password; and initiating authorization of the group interaction using credentials associated with user devices in the group of user devices.

The computer readable medium 204 may also comprises code for causing the processor 202 to perform operations including receiving, by a processing computer, a group interaction request message from a user device within a group of user devices for a group interaction; responsive to receiving the request for the group interaction, determining, by the processing computer, a token and linking the token to a credential associated with the user device in the group of user devices; providing, by the processing computer, the token to the user device; receiving, by a processing computer, an authorization request message comprising the token and an initial value; determining, the credential associated with the token; transmitting, by the processing computer to an authorizing entity computer, the authorization request comprising the credential and the initial value, wherein the authorizing entity computer approves of the authorization request message, and responsive to transmitting the authorization request message, receiving, by the processing computer from the authorizing entity computer, an authorization response message, wherein the processing computer performs subsequent processing with credentials associated with at least the other users devices in the group of user devices to complete the group interaction.

Figure 3:
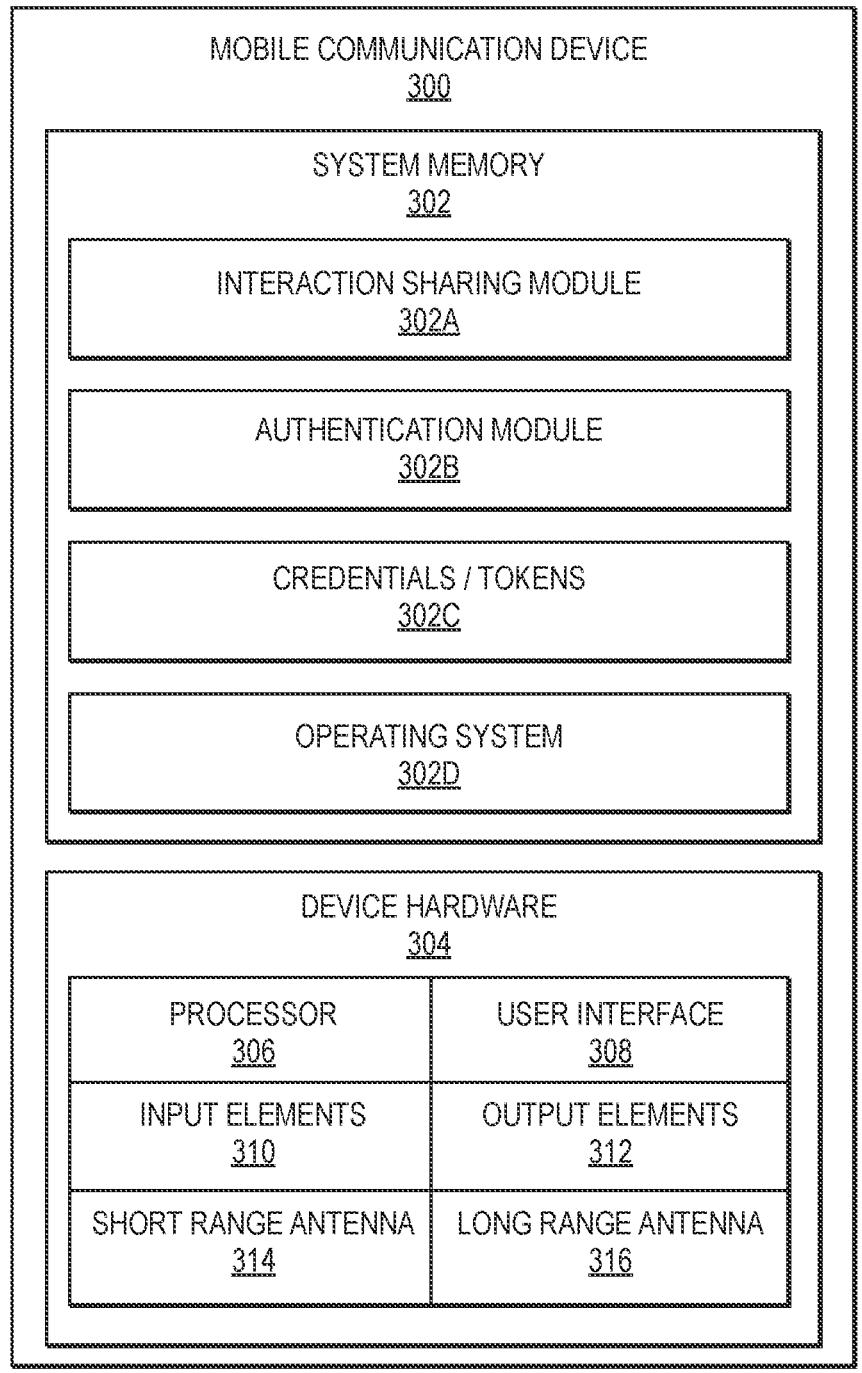
FIG. 3 shows a block diagram of a user device according to an embodiment.

FIG. 3 illustrates a mobile communication device 300 according to an embodiment. Mobile communication device 300 may include device hardware 304 coupled to a system memory 302.

Device hardware 304 may include a processor 306, a short range antenna 314, a long range antenna 316, input elements 310, a user interface 308, and output elements 312 (which may be part of the user interface 308). Examples of input elements may include microphones, keypads, touchscreens, sensors, etc. Examples of output elements may include speakers, display screens, and tactile devices. The processor 306 can be implemented as one or more integrated circuits (e.g., one or more single core or multicore microprocessors and/or microcontrollers), and is used to control the operation of mobile communication device 300. The processor 306 can execute a variety of programs in response to program code or computer-readable code stored in the system memory 302, and can maintain multiple concurrently executing programs or processes.

The long range antenna 316 may include one or more RF transceivers and/or connectors that can be used by mobile communication device 300 to communicate with other devices and/or to connect with external networks. The user interface 308 can include any combination of input and output elements to allow a user to interact with and invoke the functionalities of mobile communication device 300. The short range antenna 314 may be configured to communicate with external entities through a short range communication medium (e.g. using Bluetooth, Wi-Fi, infrared, NFC, etc.). The long range antenna 819 may be configured to communicate with a remote base station and a remote cellular or data network, over the air.

The system memory 302 can be implemented using any combination of any number of non-volatile memories (e.g., flash memory) and volatile memories (e.g. DRAM, SRAM), or any other non-transitory storage medium, or a combination thereof media.

The system memory 302 may also store an interaction sharing module 302A, an authentication module 302B, credentials/tokens 302C, and an operating system 302D, The interaction sharing module 302A may include instructions or code initiating and conducting an interaction an external device such as another user device, an access device or a processing computer. The interaction sharing module 302 can also include code for causing the processor 306 to share password portions, receive password portions, concatenate password portions, share and/or generate group identifiers, etc. The authentication module 302B may comprise code, executable by the processor 306, to authenticate a user. This can be performed using user secrets (e.g., passwords) or user biometrics.

System memory 302 may also store credentials and/or tokens 302C. Credentials may also include information identifying the mobile communication device 300 and/or the user of the mobile communication device 300. Examples of credentials may include primary account number, and an example of a token may be an access token such as a payment token.

Methods according to embodiments of the invention can be described with reference to FIG. 4. The embodiments described with respect to FIG. 4 can include the generation of a one-time password, and password portions that are sent to the user devices associated with the users in a group.

In steps S402 and S404, a first user using a first user device 102A and a second user using a second user device 102B can enroll with a processing computer 108. The first user device 102A and the second user device 102B may be devices within a group of user devices. Note that although only two user devices are illustrated in FIG. 4 for purposes of illustration, it is understood that embodiments of the invention can include any number of users and user devices.

Each of the first user device 102A and the second user device 102B can each have a sharing application (e.g., a ride sharing application, a dining sharing application, etc.) stored on them. The sharing application can allow first user and the second user to provide information to the processing computer 108, as well as communicate with each other via the first user device 102A and the second user device 102B. Information that can be provided by each user to the processing computer 108 can include a user device identifier for the user's user device and a credential associated with the user. Suitable user device identifiers may include phone numbers, e-mail addresses, etc. Credentials may include access credentials such as account numbers (e.g., credit and debit card numbers, secrets, etc.), account numbers and expiration dates, etc. Each user device may also optionally provide information such as a group identifier for a predetermined group of users and/or information regarding a share of responsibility or rules regarding any group interaction involving the group. For example, the first user of the first user device 102A and the second user of the second user device 102B may agree in advance that they wish to split any obligations such as payment obligations for group interactions involving the two users so that each user has 50 percent responsibility. The sharing application may assign a group identifier to the group and this group identifier may be stored at the processing computer 108.

In step S406, the first user using the first user device 102A may transmit a group interaction request message to the processing computer 108. The group interaction request message could include a group identifier for the group if the group is identified in advance. The group identifier can identify the first and second user devices 102A, 102B. In this regard, the group identifier that is in the group interaction request message could include a combination of the user device identifiers (or derivatives thereof) for the first user device 102A and the second user device 102B. In other embodiments, the group interaction request message could include user device identifiers or credentials associated with the first user device 102A and the second user device 102B so that the processing computer 108 can identify the users in the group. The group interaction request message can include aspects of a token request message, which is described above.

Prior to transmitting the group interaction request message, the first and second users operating the first user device 102A and the second user device 102B can agree to conduct the current interaction using a group interaction with a resource provider operating the resource provider computer 104. For example, the resource provider may be a restaurant, and first user and the second user may be customers at the restaurant and may want to pay for a meal by interacting with the restaurant with one interaction, instead of requiring each of the first user and the second user to interact individually with the restaurant. In another example, the resource provider may be a building, and first user and the second user may be guests that wish to enter the building and may wish to access the building by interacting with a building access device once, instead of requiring each of the first user and the second user to interact individually with the building access device. The first user device 102A and the second user device 102B may exchange messages through their sharing applications (e.g., through a local data connection or via an intermediate server computer such as an application server computer in the processing computer that supports the transfer application) indicating an intent to form a group, and optionally the obligations of the users in the group. One or both of the sharing applications (in conjunction with an associated application server computer) and may generate a group identifier for the group.

In some embodiments, as noted above, the group identifier may have been previously determined during the enrollment process, well before a specific group interaction takes place. For example, if the first user and the second user frequently conduct interactions together, then they may be assigned a group identifier in advance. In other embodiments, the group identifier can be determined once the first user and the second user agree to conduct an interaction (e.g., just before a group interaction is to take place). In still other embodiments, the group identifier can be assigned to the group after the processing computer 108 receives data regarding the members in the group in the group interaction request message.

Responsive to receiving the request for the group interaction, the processing computer 108 can determine a token. The processing computer 108 can generate the token or retrieve the token from a database. The token may also have a limited lifetime or may only be used for the current interaction. The determined token may be stored in the database in the processing computer 108 in conjunction with the group identifier, and data regarding the members of the group (e.g., their credentials, user device identifiers, etc.). The token may be linked to the credentials associated with the first user and the second user. The credentials may have been previously linked to the group identifier for the group including the first user and the second user.

After determining the token, in step S408, the processing computer 108 can provide (e.g., transmit) the token to one member of the group of users. For example, the processing computer 108 can provide the token to the first user device 102A operated by the first user. The first user device 102A could then store the token until it is time to conduct the group interaction. In other embodiments, the processing computer 108 could provide the token to all of the user devices in the group, or possibly directly to the resource provider computer 104.

When the first user of the first user device 102A is ready to conduct the group interaction with the resource provider operating the resource provider computer 104, the first user device 102A can provide the token to the resource provider computer 104 in step S410. The first user device 102 may transmit the token to the resource provider computer 104 via a local data connection or some other means. In step S412, the resource provider computer 104 can generate an authorization request message including the token and an initial amount such as a transaction amount for the group interaction. The resource provider computer 104 can then transmit it to the transport computer 106. In step S414, the transport computer 106 may transmit the authorization request message to the processing computer 108.

In step S416, in response to receiving the authorization request message comprising the token and the initial amount, the processing computer 108 can determine (e.g., generate) a one-time password. The one-time password can comprises a plurality of password portions. For example, a one-time password may be "35837288" and may include portions "3583" and "7288." The one-time password can be stored with the file associated with the group identifier for the group including the first user and the second user. The one-time password portions can also be stored with respect to the information associated with the respective users and users devices that will receive the one-time password portions.

In steps S418 and S420, the processing computer can transmit the plurality of authentication messages comprising the password portions to the group of user devices including the first user device 102A and the second user device 102B, respectively. In the example above, the password portion "3583" and "7288" may be transmitted to the first user device 102A and the second user device 102B, respectively. The transmission may be through an out of band communication channel such as SMS or e-mail. This can be advantageous as this will also serve as a two-factor authentication process and the eventual re-creation of the one-time password can also serve to confirm the intent of users in the group to conduct the group interaction.

In step S422, the first user device 102A and the second user device 102B may share the password portions. At least some of the plurality of password portions are obtained by the one of the user devices (e.g. the first user device 102A) via a group interaction application such as the sharing application on each of the user devices in the group of user devices. One of the user devices (e.g. the first user device 102A) concatenates the at least some of the plurality of password portions and a password portion that is stored by the one of the user devices to form the one-time password. For example, one or both of the first and second user devices A, B 102A, 102B can concatenate the password portions "3583" and "7288" to form the one-time password "35837288." The sharing application or the information associated with the group may indicate how the password portions are to be concatenated. For instance, the processing computer 108 and the sharing application may include a rule which indicates that the password portions of the one-time password are to be concatenated sequentially in ascending order according to the phone numbers associated with the user devices. Other concatenation rules may be used in other embodiments.

In step S424 and S426, one or both of the first and second user devices 102A, 102B can transmit the password to the processing computer 108. Thus, the one-time password can be received, by the processing computer 108 from one of the user devices within the group.

After receiving the one-time password, the processing computer, can initiate authorization of the group interaction using credentials associated with first and second user devices 102A, 102B in the group of user devices. For example, in step S428, the processing computer 108 can determine the credential for the first user device 102A and can generate an authorization request message and can transmit it to the authorizing entity computer 110 for authorization. In step S430, the authorizing entity computer 110 can generate and transmit an authorization response message back to the processing computer 108. Similarly, in step S432, the processing computer 108 can determine the credential for the second user device 102B and can generate an authorization request message and can transmit it to the authorizing entity computer 110 for authorization. In step S434, the authorizing entity computer 110 can generate and transmit an authorization response message back to the processing computer 108. The messages transmitted in steps S428, S430, S432, S434 may include the group identifier or another transaction identifier so that the processing computer 108 can link the messages to the same group interaction.

In step S436, after all of the authorization response messages have been received by the processing computer 108, the processing computer 108 can obtain the token associated with the group interaction, and can then transmit a single authorization response message back to the resource provider computer 104 via the transport computer 106 in steps S438 and S440.

In step S442, a clearing and settlement process can occur between the transport computer 106, the processing computer 108, and the authorizing entity computer 110.

Figure 4:
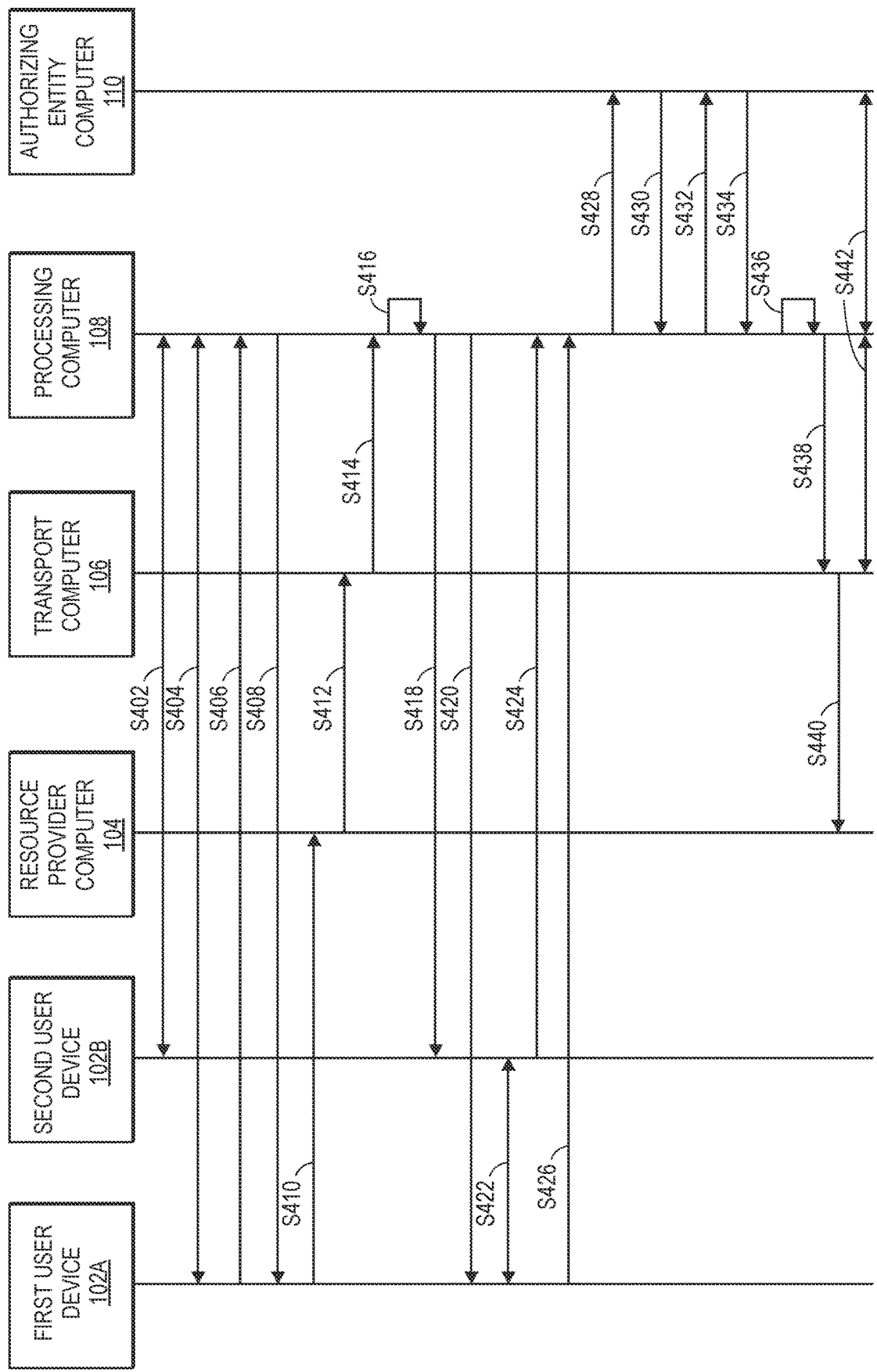
FIG. 4 shows a flow diagram illustrating some embodiments.

The embodiments described with respect to FIG. 4 have a number of advantages. For example, a group interaction can be completed with a minimum number of messages, while ensuring that every member of a group of users has properly consented to the interaction. As such, the resource provider can be assured that the interaction will be completed with the group of users.

Figure 5:
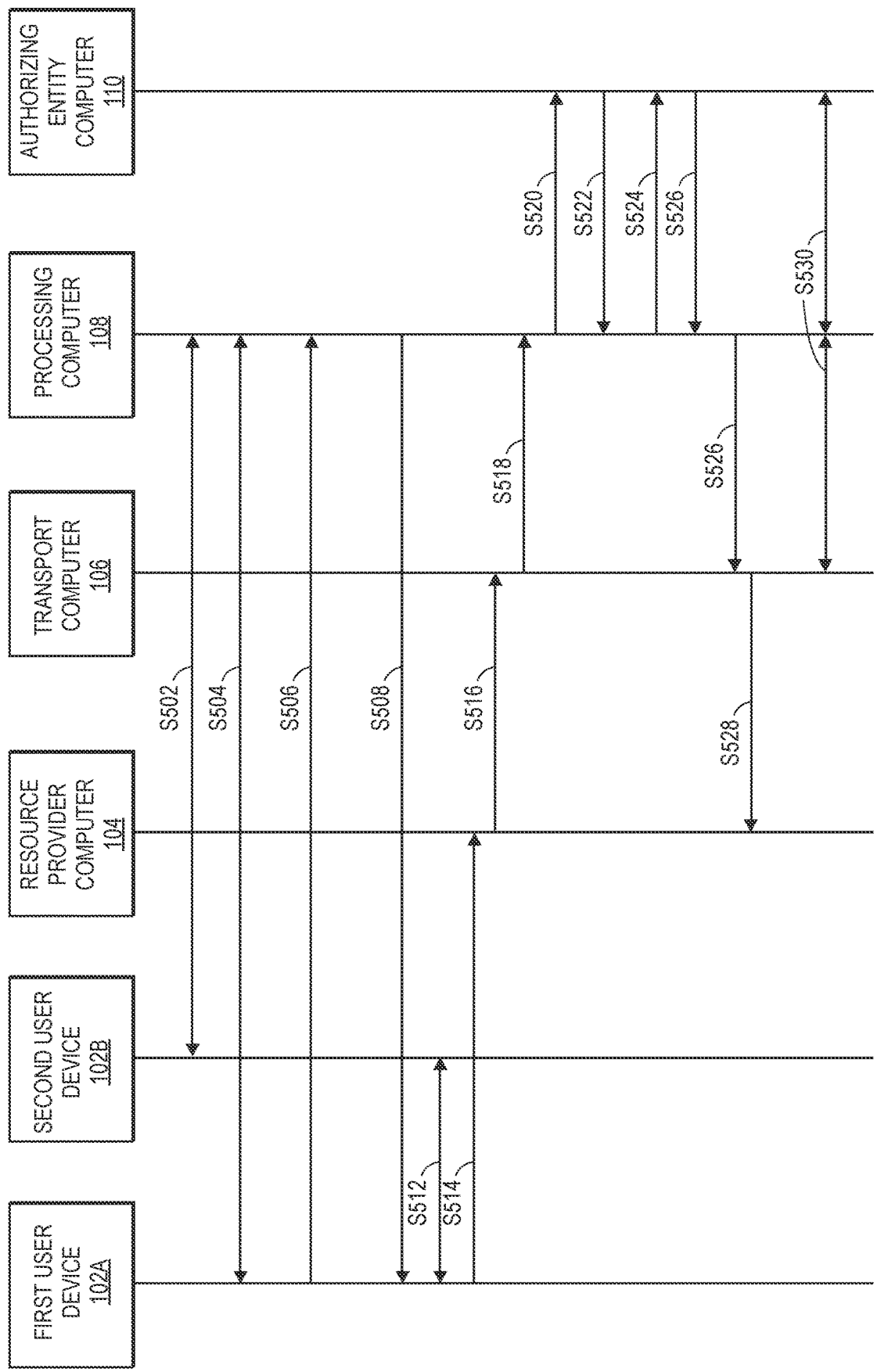
FIG. 5 shows a flow diagram illustrating additional embodiments.

Additional methods according to embodiments of the invention can be described with reference to FIG. 5. In the method of FIG. 5, a primary user of a group can submit a first authorization request message for an entire amount associated with a group of users. Later, transaction messages can be sent with respect to the other users in the group.

In FIG. 5, steps S502, S504, S506, and S508 are similar to steps S402, S404, S406, and S408 in FIG. 4, and the descriptions thereof are incorporated herein.

In step S512, the first user and the second user using the first user device 102A and the second user device 102B can communicate with each other via the sharing applications on their devices. In their communications, they can agree to on any particular sharing amounts if they have not already been previously agreed to.

When the first user of the first user device 102A is ready to conduct the interaction with the resource provider operating the resource provider computer 104, the first user device 102A can provide the token to the resource provider computer 104 in step S514. In step S516, the resource provider computer 104 can generate an authorization request message including the token and an initial amount such as the total amount for the interaction, and can transmit it to the transport computer 106. In step S518, the transport computer 106 may transmit the authorization request message to the processing computer 108.

Once the processing computer 108 receives the authorization request message, it may determine the token in a similar of different manner as described above with respect to FIG. 4. The processing computer 108 can substitute a real credential of the first user operating the first user device in the authorization request message. In the method described with respect to FIG. 5, instead of sending authentication messages to the first and second user devices 102A, 102B as in the method in FIG. 4, the processing computer 108 may submit the authorization request message with the real credential of the first user and the initial amount to the authorizing entity computer 110 in step S520. A pre-authorization hold for the initial amount can then be performed on the account associated with the credential of the first user. This can be done to ensure that the resource provider associated with the resource provider computer 104 is guaranteed to be paid for the full amount of the group interaction, even if one of the other users in the group cannot pay for their amount(s).

Once the authorizing entity computer 110 receives the authorization request message, it may determine whether or not to authorize the authorization request message. The authorizing entity computer 110 can then generate and transmit an authorization response message to the processing computer 108 in step S522. A hold for the total amount of the transaction may be placed on the account associated with the credential associated with the real credential of the first user of the first user device 102A.

After the processing computer 108 receives the authorization response message, the processing computer 108 may perform subsequent processing with credentials associated with at least other users in the group of user devices to complete the group interaction. For example, the processing computer 108 can retrieve the real credential for the second user operating the second user device 102B. The processing computer 108 can check the database to determine what proportion of the total amount the second user of the second user device 102B needs to pay for the transaction. The processing computer 108 can generate an authorization request message for the partial amount. For example, if the total amount of the interaction was $100 and the partial amount is $50, then the authorization request message with an amount of $50 may be transmitted to the authorizing entity computer 110 in step S524. After the authorizing entity computer receives the authorization request message comprising the partial amount, the authorizing entity computer 110 determine whether or not to authorize the authorization request message. The authorizing entity computer 110 can then generate and transmit an authorization response message to the processing computer in step S526.

In steps S526, S528, the processing computer may transmit an authorization response message to the resource provider computer 104 via the transport computer indicating that the total amount has been authorized. The authorization response message may comprise the token that was originally sent in the authorization request message in step S516.

In step 530, a clearing and settlement process can occur between the transport computer 106, the processing computer 108, and the authorizing entity computer 110. In the clearing and settlement process, the processing computer 108 can settle the transaction by instructing the transfer of the partial amount owed by the second user from the authorizing entity computer 110 to the transport computer 106. The processing computer 108 can settle the transaction by instructing the transfer of the partial amount owed by the first user from the authorizing entity computer 110 to the transport computer 106. The settlement amount for the first user would be less than the amount that was authorized in the first authorization request message in step S520.

Other embodiments may include modifications to the method in FIG. 5. For example, in other embodiments, the authorization request message S524 need not be sent to the authorizing entity computer 110. The processing computer 108 may identify the proportions of the initial amount owned by the first user and the second user and transfer those amounts from the authorizing entity computer 110 to the transport computer 106 via the processing computer 108 in the clearing and settlement process.

The embodiments described with respect to FIG. 5 have a number of advantages. In the embodiments, an initial authorization request message with an initial amount equal to a total amount charged to a group can be submitted, and the subsequent group obligations can be facilitated in subsequent authorization or settlement processing. The resource provider can have assurance that the interaction will complete properly, while minimizing the number of messages that are transmitted to complete the group interaction.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a processing computer, a group interaction request message for a group interaction from a user device within a group of user devices;
   responsive to receiving the group interaction request message, determining, by the processing computer, a token;
   providing, by the processing computer, the token to the user device;
   receiving, by the processing computer, an authorization request message comprising the token;
   responsive to receiving the authorization request message, generating a one-time password, the one-time password comprising a plurality of password portions;
   transmitting, by the processing computer, the plurality of password portions to the group of user devices, respectively;
   receiving, by the processing computer, from one of the user devices within the group of user devices, the one-time password; and
   initiating, by the processing computer, authorization of the group interaction using credentials associated with user devices in the group of user devices.

2. The method of claim 1, wherein initiating authorization comprises:
   generating a plurality of authorization request messages comprising the credentials; and
   transmitting the plurality of authorization request messages to a plurality of authorizing entity computers for authorization.

3. The method of claim 1, wherein the token is a one-time use token.

4. The method of claim 1, wherein the authorization request message is received from a resource provider computer.

5. The method of claim 1, wherein the plurality of password portions are concatenated together to form the one-time password, and is entered into one user device of the group of users devices before the one-time password is received from the one of the user devices.

6. The method of claim 1, wherein the one of the user devices is the user device within the group of user devices.

7. The method of claim 1, wherein at least some of the plurality of password portions are obtained by the one of the user devices via a group interaction application on each of the user devices in the group of user devices, and the one of the user devices concatenates the at least some of the plurality of password portions and a password portion that is stored by the one of the user devices to form the one-time password, and then transits the one-time password to the processing computer before the one-time password is received from the one of the user devices.

8. The method of claim 1, further comprising:
   receiving user data from each of the user devices before the group interaction request message is received from the user device within the group of user devices.

9. The method of claim 1, further comprising:
   receiving user data from each of the user devices before the group interaction request message is received from the user device within the group of user devices, the user data comprising a user device identifier and a credential.

10. The method of claim 1, further comprising:
    receiving user data from each of the user devices before the group interaction request message is received from the user device within the group of user devices, the user data comprising a user device identifier and a credential, wherein the credential is a primary account number.

11. The method of claim 1, wherein the user devices are mobile phones.

12. The method of claim 1, wherein the initiating authorization of the group interaction comprises:
    generating a plurality of authorization request messages comprising the credentials; and
    transmitting the plurality of authorization request messages to a plurality of authorizing entity computers for authorization, and wherein the method further comprises:
    receiving, by the processing computer, from the plurality of authorizing entity computers, a plurality of authorization response messages; and
    transmitting by the processing computer, the plurality of authorization response messages to a single transport computer.

13. The method of claim 1, wherein initiating authorization comprises:
    generating a plurality of authorization request messages comprising the credentials and portions of an initial value, respectively; and
    transmitting the plurality of authorization request messages to a plurality of authorizing entity computers for authorization.

14. The method of claim 13, wherein the authorization request message comprises the initial value.

15. A processor computer comprising:
    a processor; and
    a computer readable medium, the computer readable medium comprising code, executable by the processor for performing operations including:

receiving a group interaction request message for a group interaction 5 from a user device within a group of user devices;

responsive to receiving the group interaction request message, determining a token;

providing the token to the user device;

receiving an authorization request message comprising the token;

responsive to receiving the authorization request message, generating a one-time password, the one-time password comprising a plurality of password portions;

transmitting the plurality of password portions to the group of user devices, respectively;

receiving from one of the user devices within the group of user devices, the one-time password; and initiating authorization of the group interaction using credentials associated with user devices in the group of user devices.

16. A method comprising:

receiving, by a processing computer, a group interaction request message from a user device within a group of user devices for a group interaction;

responsive to receiving the group interaction request message, determining, by the processing computer, a token and linking the token to a credential associated with the user device in the group of user devices;

providing, by the processing computer, the token to the user device;

receiving, by the processing computer, an authorization request message comprising the token and an initial value;

determining, the credential associated with the token;

transmitting, by the processing computer to an authorizing entity computer, the authorization request message comprising the credential and the initial value, wherein the authorizing entity computer approves of the authorization request message; and responsive to transmitting the authorization request message, receiving, by the processing computer from the authorizing entity computer, an authorization response message, wherein the processing computer performs subsequent processing with credentials associated with at least the other user devices in the group of user devices to complete the group interaction.

17. The method of claim 16, wherein the subsequent processing comprises:

generating, by the processing computer, authorization request messages for at least the other user devices in the group of user devices; and transmitting, by the processing computer, the authorization request messages to one or more authorizing entity computers for authorization.

18. The method of claim 17, wherein the authorization request messages comprise amounts which total an amount equal to or less than the initial value.

19. The method of claim 16, wherein the subsequent processing comprises:

generating, by the processing computer, authorization request messages for at least the other uses devices in the group of user devices; and transmitting, by the processing computer, the authorization request messages to one or more authorizing entity computers for authorization.

20. The method of claim 16, wherein after the authorizing entity computer approves of the authorization request message, the authorizing entity computer holds an amount equal to the initial value in an account associated with the credential.

\* \* \* \* \*